Feb. 28, 1950     H. B. BARRETT     2,498,937
APPARATUS FOR SECURING LINING MATERIAL TO BRAKE SHOES
Filed Feb. 15, 1947     2 Sheets-Sheet 1

INVENTOR
HARRY B. BARRETT
BY
ATTORNEY

Feb. 28, 1950     H. B. BARRETT     2,498,937
APPARATUS FOR SECURING LINING MATERIAL TO BRAKE SHOES
Filed Feb. 15, 1947     2 Sheets-Sheet 2

INVENTOR
HARRY B. BARRETT
BY Alfred W. Pitcher
ATTORNEY

Patented Feb. 28, 1950

2,498,937

UNITED STATES PATENT OFFICE 2,498,937

APPARATUS FOR SECURING LINING MATERIAL TO BRAKE SHOES

Harry B. Barrett, St. Louis, Mo.

Application February 15, 1947, Serial No. 728,762

10 Claims. (Cl. 154—1)

This invention relates to certain new and useful improvements in means for securing lining materials to brake shoes.

Heretofore, the lining materials for automotive brakes have been secured upon the brake shoe by means of rivets which were ordinarily located in countersunk recesses in the lining material. Thus, the outermost surface of the rivet head was located about half way through the thickness of the lining material, with the result that as soon as the lining material had worn away to half thickness as a result of normal operation of the brake, the rivet heads would then become exposed, causing squeaking and squealing of the brakes and seriously impairing the proper braking action of the brake. If the motorist allows this condition to prevail and does not have his brakes relined promptly, the exposed rivet heads will begin to score the inner surface of the brake drum, so that, when the brakes are ultimately repaired, the brake drums will either require resurfacing or complete replacement, either of which operations is comparatively expensive and time consuming.

It is hence the primary object of the present invention to provide means for securing brake lining materials to brake shoes without the employment of rivets or other mechanical attachment means.

It is a further object of the present invention to provide means for securing lining materials to brake shoes by a process of adhesion in the nature of vulcanization.

It is a further object of the present invention to provide means for securing brake lining materials to brake shoes through adhesion, which means is simple and economical in construction and may be conveniently used in a time-saving and efficient manner.

It is also an object of the present invention to provide means for securing brake lining materials to brake shoes, which means is relatively flexible in adaptation to a wide range of different sizes and types of brake shoes.

It is a further object of the present invention to provide means for effecting adhesion between brake lining materials and brake shoes, which means is uniquely adapted for the imposition and maintenance of substantially higher contact pressure between the lining materials and the brake shoe during the so-called vulcanizing process.

With the above and other objects in view, my invention resides in the novel features of form, construction, arrangement, and combination of parts presently described and pointed out in the claims.

In the accompanying drawings (two sheets)—

Figure 1:
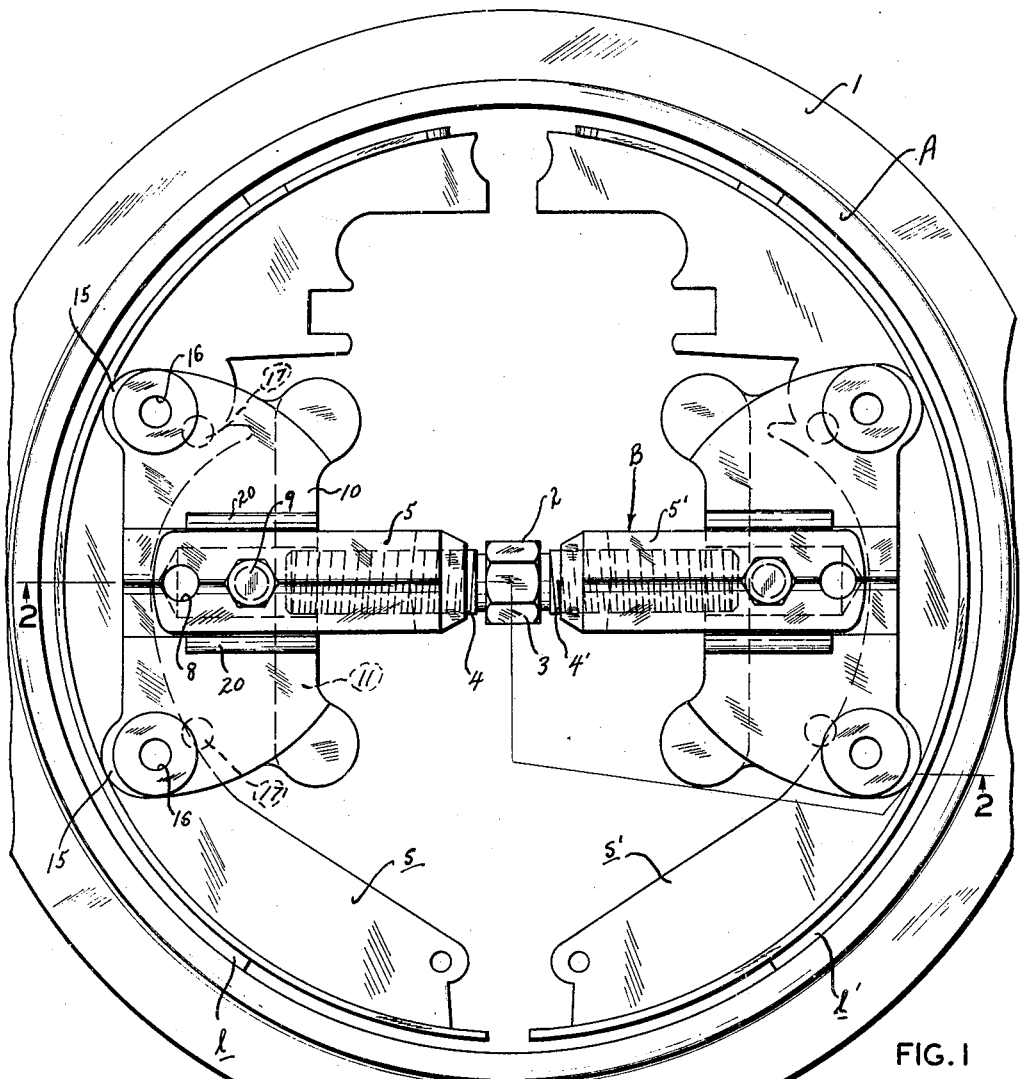
Figure 1 is a partly broken away top plan view of a brake lining vulcanizing device constructed in accordance with and embodying the present invention.
Figure 2:
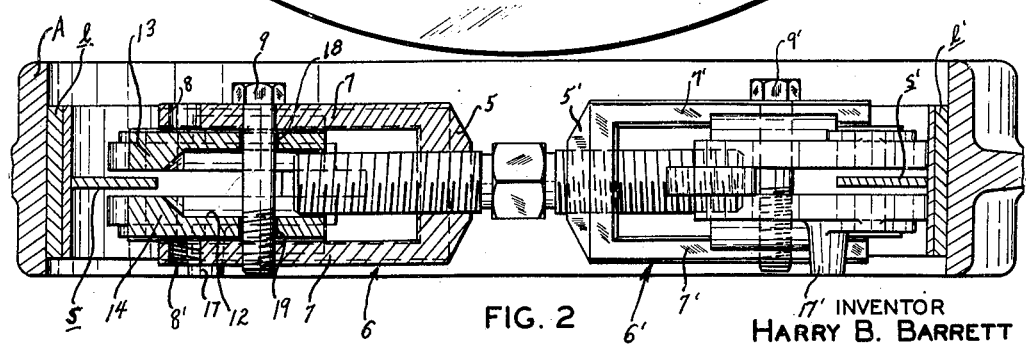
Figure 2 is a transverse sectional view taken approximately along line 2—2 of Figure 1.
Figure 3:
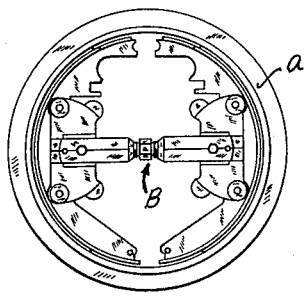
Figure 4:
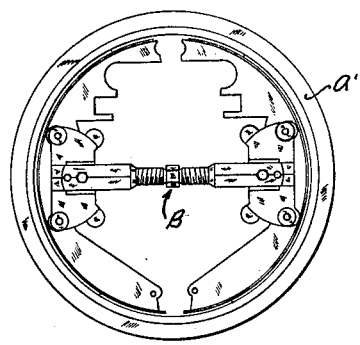
Figure 5:
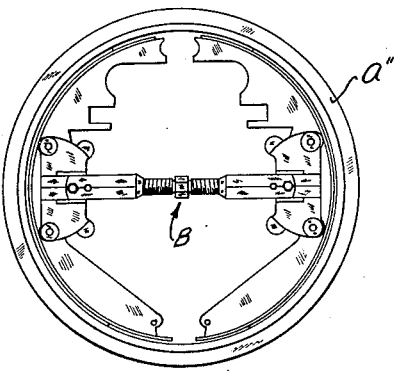
Figure 6:
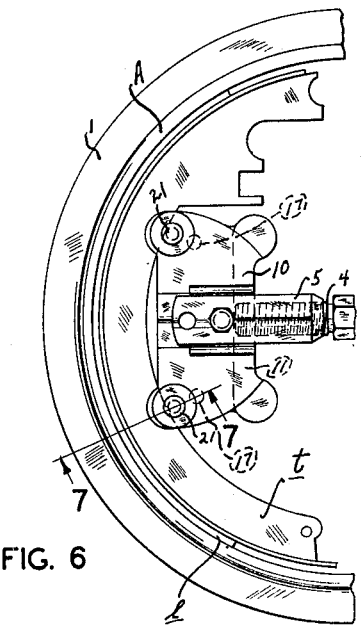
Figure 8:
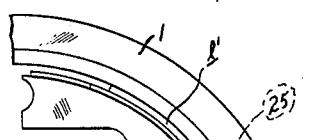
Figure 9:
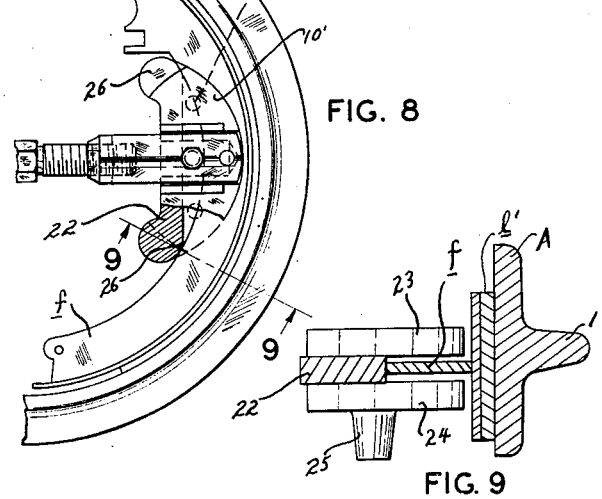
Figure 7:
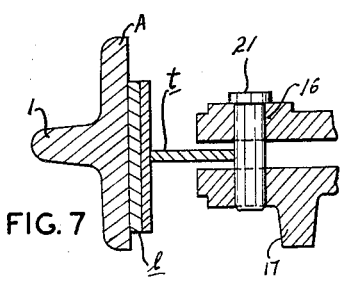

Figures 3, 4, and 5 are reduced-size top plan views of the brake lining vulcanizing device as applied to brake shoes of different diametral sizes;

Figure 6 is a fragmentary view of the brake lining vulcanizing device of the present invention as applied to a type of brake shoe different from the brake shoes shown in the above figures;

Figure 7 is a fragmentary transverse sectional view taken along line 7—7, Figure 6;

Figure 8 is a fragmentary top plan view, partly broken away and in section, of a modified form of brake lining vulcanizing device; and Figure 9 is a fragmentary sectional view taken along line 9—9 of Figure 8.

Referring now in more detail and by reference characters to the drawings, which illustrate practical embodiments of the present invention, A designates an outer semi-rigid ring or annulus having an axial width sufficient to accommodate the normal range of widths encountered in standard automobile brake shoes and is provided upon its outer peripheral face with a circumferentially projecting central reinforcing flange 1. Upon its inner face, the ring A is accurately machined to predetermined diametral size for accommodating brake shoes corresponding to that diametral size and is so designed as to have a strength comparable to the strength of the ordinary brake drum of that size. In other words, the finished ring A is designed to have approximately the same degree of flexibility under radially outwardly imposed expansive pressure as an ordinary brake drum. It will, of course, be apparent that any brake relining or repair shop employing the method of the present invention will be equipped with a plurality of different sizes of rings A so as to be able to handle brake drums of all standard sizes. Inasmuch as there are only a few commonly employed diametral sizes, which have become more or less standard for automobiles in this country, the number of such rings required will not be excessive.

Provided for co-operation with the ring A is a spreader B consisting of a central turnbuckle type screw 2 integrally including a central hexagonal portion 3 and two coaxial oppositely threaded shank portions 4, 4', which respectively extend through the correspondingly threaded bight portions 5 of substantially identical U-shaped clevices 6, each having flat spaced parallel leg portions 7, the latter being provided with two pairs of aligned apertures 8, 8', for operatively receiving drop bolts 9 which may optionally be dropped through either of the apertures 8 and threaded into the corresponding aperture 8'.

Shiftably mounted within each of the clevises 6 is a shoe holder 10 integrally comprising a flat elongated body portion 11 provided with a central clearance aperture 12 located for loose fitting disposition around the outer ends of the threaded shank portions 4, 4', of the screw 2. Formed integrally with, and extending forwardly from, the body portion 11 is a pair of spaced parallel flanges 13, 14, provided at their outer corners with arcuate abutment bosses 15 having apertures 16. The lower flanges 14 are provided with downwardly projecting leg-forming bosses 17 which are of such height that, when the ring A is resting edgewise upon a bench or table and the spreader B disposed therein with the leg-forming bosses 17 likewise resting upon the table, the horizontal center lines of the ring A and spreader B will be substantially aligned.

The flanges 13, 14, are finally provided with aligned apertures 18, 19, for receiving and clearing the drop bolts 9. The flange 13 is furthermore integrally provided upon its outer face with a pair of spaced parallel guide ribs 20 machined along their inner faces for loose sliding engagement with the oppositely presented side faces of the clevis leg 7 for preventing the shoe holder 10 from rocking with respect to the clevis 6 during actual use.

In use, a pair of matching brake shoes s, s', which are to be relined, are removed from the wheel and the outer arcuate faces are thoroughly cleaned and coated with a fairly heavy layer of preferably heat-solidifying cement of the type disclosed in copending application Serial No. 728,963, filed contemporaneously herewith. The cement should be of such a type as will become tacky and fairly adhesive within the matter of a few minutes under normal atmospheric conditions and thereupon the strips of lining material 1, 1', are applied to the shoes respectively, and web portions of the shoes s, s', may be inserted between the flanges 13, 14, of the shoe holders 10, so that the bosses 15 thereof will rest abuttingly against the inwardly presented or rear faces of the shoes s, s', the screw 2 being reversely turned so as to draw the clevises 6 together and initially hold the shoes within the compass of a smaller circle than the inside diametral size of the ring A. Thereupon, the ring A may be dropped loosely around the outside of the shoes s, s', as they are held in the retracted spreader B and the screw 2 turned reversely to force the clevis members 6 and the supported brake shoes s, s', outwardly against the ring A. A wrench or other torque applying tool may be placed on the head portion 3 of the screw 2 and the turning motion continued, so that the strips of lining 1, 1', may be squeezed tightly against the shoes s, s', with uniform radial pressure. It has been found in actual practice that pressures in excess of one hundred pounds per square inch can be simply and readily maintained against the lining strips 1, 1', and, in addition, the spreader B has been found to be self-aligning in that it will, in being tightened, shift itself, if necessary, into more or less precise diametral position, so that the clamping force which it exerts against the brake shoes will be applied uniformly and radially over the entire area of contact between the faces of the lining strips 1, 1', and the inner face of the ring A.

With the lining strips 1, 1', thus held tightly against the brake shoes s, s', respectively, the ring A and spreader B, together with the shoes s, s', may be bodily inserted, as a unit, into any conventional type of constant temperature oven and allowed to remain at a predetermined temperature for a desired interval of time to permit a complete hardening of the adhesive coating. Thereupon, the entire unit may be removed from the oven, cooled, and the spreader B removed, releasing the shoes s, s', from the ring A. It will be found that the lining strips 1, 1', will have become firmly and immovably fixed upon the outer face of the brake shoes s, s', and "vulcanized" thereon, as it may be said. The brake shoes s, s', may thereupon be reinstalled in the brake assembly of the automobile in the usual and conventional manner and will have a much improved and lengthened service life.

Furthermore, brakes lined in accordance with the present invention may be used until the linings have worn almost completely away. Because of the absence of rivets and the intimate bond between the lining and the shoe over the entire area of contact therebetween, the brake will provide efficient braking action even when the lining is almost completely worn away. Since no rivets are required, the only scoring which can take place will result from the abrasive action of sand and grit which will work into the interior of the brake in the course of time, but even such grit and dirt will not score or otherwise damage the brake shoe inasmuch as the residual film or coating of cementitious material will serve as a sort of lubricating agent.

In vulcanizing linings to brake shoes of small diameter, a small size ring A may be employed, as shown in Figure 3, in which case the spreader B will be drawn down to its smallest size. For brake shoes of somewhat larger diameter, a correspondingly larger ring A' may be employed, as shown in Figure 4, and the spreader B will be extended to an appropriately increased diametral size. Similarly, for brake shoes of relatively large diametral size, a correspondingly large-sized ring A'' may be used and the spreader B may be extended to an increased diametral size by removing the drop bolts 9 and sliding the shoe holders 10 outwardly, so that the drop bolts 9 may be inserted through the outermost pair of clevis apertures 8, 8'.

In the case of certain kinds of brake shoes, such as the brake shoe t shown in Figure 6, it frequently becomes necessary to exert pressure against the inner edge or margin of the web thereof, in which case drop pins 21 can be inserted through the apertures 16 of the shoe holders 10 so as to bear against the edge of the web, as shown in Figure 7.

Similarly, a modified form of shoe holder 10' may be provided, as shown in Figure 8, which integrally includes an elongated transversely extending body member 22 having outwardly projecting arcuate flanges 23, 24, the latter being provided on its under face with depending leg-forming bosses 25. At its outer ends, the body portion 22 is provided with rounded off contact bosses 26 for bearing against the inner edge of the brake shoe flange f, substantially as shown in Figure 9.

It should be understood that changes and modifications in the form, construction, arrangement, and combination of the several parts of the means for securing lining materials to brake shoes may be made and substituted for those herein shown and described without departing from the nature and principle of my invention.

Having thus described my invention, what I claim and desire to secure by Letters Patent is:

1. A device for use in adhesively securing a brake lining material to brake shoes, which device comprises, in combination, a ring sized for internally accommodating a plurality of brake shoes with strips of lining material applied to the faces thereof, an expansible spreader adapted for disposition within the ring having a pair of oppositely presented shoe-holders for abutting engagement with the rear faces of the shoes adjacent the webs thereof, clevises disposed around and connected to each shoe-holder, and a turnbuckle type screw threadedly engaged in each clevis.

2. A device for use in adhesively securing a brake lining material to brake shoes, which device comprises, in combination, a ring sized for internally accommodating a plurality of brake shoes with strips of lining material applied to the faces thereof, an expansible spreader adapted for disposition within the ring having a pair of oppositely presented shoe-holders provided with spaced parallel flanges adapted to lie on opposite sides of the webs of the shoes and engage the rear faces thereof, clevises disposed around and connected to each shoe-holder, and a turnbuckle type screw threadedly engaged in each clevis.

3. A device for use in adhesively securing a brake lining material to brake shoes, which device comprises, in combination, a ring sized for internally accommodating a plurality of brake shoes with strips of lining material applied to the faces thereof, an expansible spreader adapted for disposition within the ring having a pair of oppositely presented shoe-holders provided with spaced parallel flanges adapted to lie on opposite sides of the webs of the shoes, said flanges being provided with outwardly projecting bosses for abutting engagement with the rear faces of the shoes adjacent the webs thereof, clevises disposed around each shoe-holder, and a turnbuckle type screw threadedly engaged in each clevis.

4. A device for use in adhesively securing a brake lining material to brake shoes, which device comprises, in combination, a ring sized for internally accommodating a plurality of brake shoes with strips of lining material applied to the faces thereof, an expansible spreader adapted for disposition within the ring having a pair of oppositely presented shoe-holders provided with spaced parallel flanges adapted to lie on opposite sides of the webs of the shoes for engagement against the rear faces thereof, said flanges being provided with removable pins for optional abutting engagement against the inwardly presented edges of the shoe-webs, clevises disposed around each shoe-holder, and a turnbuckle type screw threadedly engaged in each clevis.

5. A device for use in adhesively securing a brake lining material to brake shoes, which device comprises, in combination, a ring sized for internally accommodating a plurality of brake shoes with strips of lining material applied to the faces thereof, an expansible spreader adapted for disposition within the ring having a pair of oppositely presented shoe holders provided with spaced parallel flanges adapted to lie on opposite sides of the webs of the shoes and arcuate bosses disposed between the flanges for abutment against the inwardly presented margins of the shoe-webs, clevises disposed around each shoe-holder, and a turnbuckle type screw threadedly engaged in each clevis.

6. A device for use in adhesively securing a brake lining material to brake shoes, which device comprises, in combination, a semi-rigid ring sized for internally accommodating a plurality of brake shoes with strips of lining material applied to the faces thereof, an expansible spreader adapted for disposition within the ring having a pair of oppositely presented shoe-holders provided with spaced parallel flanges adapted to lie on opposite sides of the webs of the shoes, said flanges being provided with outwardly projecting arcuate bosses for abutting engagement with the rear faces of the shoes, clevises disposed around and connected to each shoe-holder, and a turnbuckle type screw threadedly engaged in each clevis.

7. A device for use in adhesively securing a brake lining material to brake shoes, which device comprises, in combination, a semi-rigid ring sized for internally accommodating a plurality of brake shoes with strips of lining material applied to the faces thereof, an expansible spreader adapted for disposition within the ring having a pair of oppositely presented shoe-holders provided with spaced parallel flanges adapted to lie on opposite sides of the webs of the shoes, said flanges being provided with outwardly projecting arcuate bosses for abutting engagement with the rear faces of the shoes, one of said flanges being further provided with downwardly projecting leg-forming bosses, clevises disposed around and connected to each shoe-holder, and a turnbuckle type screw threadedly engaged in each clevis.

8. A device for use in adhesively securing a brake lining material to brake shoes, which device comprises, in combination, a semi-rigid ring sized for internally accommodating a plurality of brake shoes with strips of lining material applied to the faces thereof, an expansible spreader adapted for disposition within the ring, said spreader comprising a turnbuckle type screw having a central hexagonal portion, two co-axial oppositely threaded shank portions extending from said central portion, a pair of U-shaped clevises, each of said shank portions extending through one of the clevises, said clevises having spaced parallel leg members, means for connecting said leg members, a shoe-holder mounted shiftably within each of the clevises, each of said shoe-holders provided with a pair of spaced parallel flanges, and arcuate abutment bosses provided on the outer portions of the flanges for abutting engagement with the rear faces of the shoes, one of said flanges being further provided with downwardly projecting leg-forming bosses.

9. A device for use in adhesively securing a brake lining material to brake shoes, which device comprises, in combination, a semi-rigid ring sized for internally accommodating a plurality of brake shoes with strips of lining material applied to the faces thereof, an expansible spreader adapted for disposition within the ring, said spreader comprising a turnbuckle type screw having a central hexagonal portion, two co-axial oppositely threaded shank portions extending from said central portion, a pair of U-shaped clevises, each of said shank portions extending through one of the clevises, said clevises having spaced parallel leg members, said legs being provided with aligned apertures, a bolt removably disposed through said aligned apertures, a shoe-holder mounted shiftably within each of the clevises, a shoe holder having a flat elongated body portion and being provided with spaced parallel flanges adapted to lie on opposite sides of the webs of the shoes, and outwardly projecting arcuate abutment bosses provided on said flanges for abutting engagement with rear faces of the shoes, each of said flanges being apertured for receiving and clearing the bolt, one of said flanges being integrally provided with a pair of spaced parallel guide ribs for stabilizing engagement with the shoe-holder.

10. A device for use in adhesively securing a brake lining material to brake shoes, which device comprises, in combination, a semi-rigid ring sized for internally accommodating a plurality of brake shoes with strips of lining material applied to the faces thereof, an expansible spreader adapted for disposition within the ring, said spreader comprising a turnbuckle type screw having a central hexagonal portion, two co-axial oppositely threaded shank portions extending from said central portion, a pair of U-shaped clevises, each of said shank portions extending through one of the clevises, said clevises having spaced parallel leg members, said legs being provided with aligned apertures, a bolt removably disposed through said aligned apertures, means for connecting said leg members, a shoe-holder mounted shiftably within each of the clevises, a shoe-holder having a flat elongated body portion and being provided with spaced parallel first and second flanges adapted to lie on opposite sides of the webs of the shoes, and outwardly projecting arcuate abutment bosses provided on said first and second flanges for abutting engagement with the rear faces of the shoes each of said flanges being apertured for receiving and clearing the bolt, said first flange being provided upon its outer face with a pair of spaced parallel guide ribs for stabilizing engagement with the shoe-holder, said second flange being further provided with downwardly projecting leg-forming bosses.

HARRY B. BARRETT.

REFERENCES CITED

The following references are of record in the file of this patent:

UNITED STATES PATENTS

| Number | Name | Date |
|---|---|---|
| 1,047,109 | Nelson | Dec. 10, 1912 |
| 1,507,748 | Meyer | Sept. 9, 1924 |
| 1,670,961 | Halbrooks | May 22, 1928 |
| 2,246,795 | Daniels | June 24, 1941 |
| 2,358,483 | Tilden | Sept. 19, 1944 |